358-86. OR 3,752,908 SR

United States Patent [19]

Boenke et al.

[11] 3,752,908

[45] Aug. 14, 1973

[54] CATV AUDIO INTERACTION SYSTEM

[75] Inventors: Clyde A. Boenke; Ronald L. Reimink; James A. Jackson, all of Ann Arbor, Mich.

[73] Assignee: KMS Industries, Inc., Ann Arbor, Mich.

[22] Filed: June 28, 1972

[21] Appl. No.: 266,923

[52] U.S. Cl. .................................. 178/5.6, 325/308
[51] Int. Cl. .............................................. H04n 7/14
[58] Field of Search .......................... 178/5.6, 5.8 R; 325/308

[56] References Cited

UNITED STATES PATENTS 3,668,307 6/1972 Foce et al. .......................... 178/5.6

*Primary Examiner*—Robert L. Richardson
*Attorney*—Richard C. Sughrue et al.

[57] ABSTRACT

A central station including a computer is connected via a multi-channel CATV cable to a plurality of remote terminal stations. Some of the channels are reserved for commercial television programs. However, a predetermined number of forward television channels are reserved for private television programs which may be generated either at the central station and transmitted on these forward channels to selected terminal stations under the control of the computer, or else a private TV program may be originated at one of the remote terminals, transmitted via the cable on a return television channel thereof to the central station, and then retransmitted from the central station via the cable on a forward television channel thereof to selected remote terminal stations under the control of the computer. Each terminal station contains an audio input means, such as a microphone and an audio transmitter, for permitting a return audio or speech signal to be inserted at the central station upon the audio subcarrier of television signal which is being received by the other remote terminal stations. For a given television channel, all terminal stations use the same audio return channel, thereby communicating in a party line mode. In one embodiment, the return audio carriers for the private television channels are generated at each terminal station and the audio interaction is provided by a novel audio insertion unit using a phase locked loop which does not require demodulation and remodulation of the video signal. In another embodiment of the invention, the audio carriers for the return audio channels are generated at the central station and transmitted to the terminals for modulation by the respective return audio inputs.

9 Claims, 6 Drawing Figures

T5002
X5060

CATV AUDIO INTERACTION SYSTEM

CROSS-REFERENCE TO RELATED COPENDING APPLICATIONS

Application Ser. No. 24,009, now U.S. Pat. No. 3,668,307 filed Mar. 30, 1970, and entitled "TWO-WAY COMMUNITY ANTENNA TELEVISION SYSTEM", describes a CATV system having certain channels reserved for private television programs and also describes one means of providing audio interaction in such a system.

Application Ser. No. 255,477, filed May 22, 1972, and entitled "VARIABLE RATE DATA ACQUISITION AND RETRIEVAL SYSTEM AND METHOD USING TWO-WAY COAXIAL CABLE", describes an improvement in such a two-way CATV system wherein the central station includes an expanded digital interface.

BACKGROUND OF THE INVENTION

1. Field of the Invention

The invention relates generally to the field of closed circuit television and, more particularly, to a closed circuit television system having improved means for permitting audio interaction of a plurality of remote terminal stations with one or more television programs being received by those stations.

2. Description of the Prior Art

In the aforementioned copending Application Ser. No. 24,009 disclosing a two-way CATV system, it was stated that only one remote terminal at a time was granted access to a forward television channel in order for that terminal to superimpose on the audio subcarrier of the television signal the terminal's return audio input. This is accomplished by sending the terminal's audio input via a return audio channel of the cable to the central station where the return audio was inserted into the television signal being transmitted along a forward television channel of the cable.

In certain situations, such as a class room situation where the terminals are used by students viewing a common television program, it is desirable to permit two or more terminals simultaneously to superimpose their return audio inputs on the television program. However, when several terminals are simultaneously interactive, the system must allow multiple return audio signals to be processed. To prevent interference between these audio return signals, each terminal could use a different return audio carrier frequency. However, in a multiple terminal system, such a solution quickly exceeds reasonable spectrum usage on the cable, especially when many audio interactive channels are in use. Other solutions include time division sampling, but the maximum sampling rates on a large cable system would not be fast enough for audio transmission.

Therefore, it is desirable to allow the simultaneous use of the same or approximately the same carrier frequency for returning audio signals from several remote terminals in a two-way closed circuit television system. However, with the use of conventional angle modulation techniques, such as FM or PM, the largest returning signal of a plurality of audio return signals on the same channel will tend to suppress all the other return signals, thereby manifesting itself as background interference and noise. Furthermore, conventional AM will produce beats between the returning carriers from the several remote terminals. Even if the returning carriers were generated by very expensive, high precision oscillators to produce carriers at very nearly identical audio carrier frequencies for use with a given forward television channel, destructive cancellation of carriers from two or more return audio signals would produce distortion in the AM detector at the central station. The latter problem can be solved through the use of single sideband reception.

More specifically, in one prior art technique for inserting audio inputs from a plurality of remote terminals into the audio subcarrier of a television signal, the TV signal, which may be derived from an off-the-air signal or may be originated by another remote terminal associated with the cable system, is demodulated at the central station to its base band audio and video components. The returning audio inputs from the plurality of the remote stations are added to the main channel audio component, and the resultant is modulated onto the desired cable forward television channel by a channel modulator. Signaling tones or other subcarrier information may also be added at this point.

However, it is not desirable to demodulate the video portion of the television signal because of the resultant unavoidable degradation of the picture quality in the demodulation-modulation process. Furthermore, processing only the audio portion by demodulation and remodulation is complicated by the fact that the frequency spacing (4.5 MHz) between the video and audio carriers in a television signal has a much tighter tolerance than the actual frequency tolerance of either carrier. Therefore, the problem to which the present invention is addressed is the accurate placing of the return audio carrier in the proper relationship on the original video carrier of the television signal.

SUMMARY OF THE INVENTION

The broad object of the invention is to provide an improved means and method for permitting simultaneous use of the same or approximately the same carrier frequency for returning audio input signals from several remote terminals in a closed circuit television system having a central station including an audio insertion unit.

A more specific object of the invention is to provide an improved method and means for inserting the return audio inputs from the remote terminals onto a television signal audio subcarrier without requiring demodulation of the video component of the received television signal and in some cases without the requirement of demodulation of the main channel audio signal, i.e. the main audio associated with the television signal itself.

Another object is to provide means for generating at a central station return audio carriers to be modulated by audio inputs at the remote terminals and returned to the central station to be inserted into the audio components of respective television signals transmitted on selected forward television channels of a transmission cable interconnecting the central station and the terminals.

BRIEF DISCUSSION OF THE DRAWINGS

DESCRIPTION OF THE PREFERRED EMBODIMENTS

Figures 1, 2:
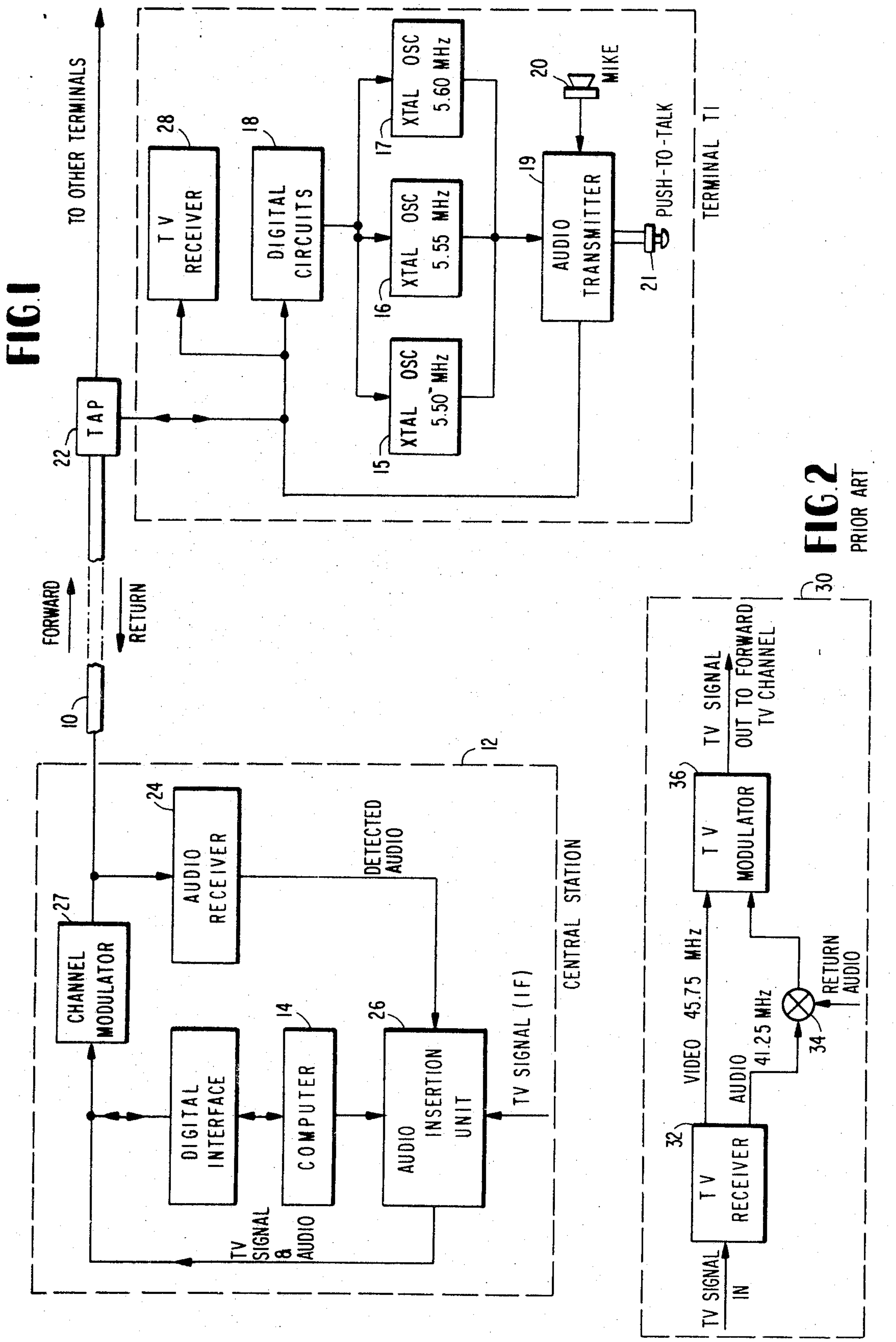
FIG. 1 is a block diagram of one embodiment of a novel audio interactive two-way CATV system.
FIG. 2 is a schematic block diagram of a prior art audio insertion unit.

FIG. 1 is a block diagram illustrating one embodiment of a two-way audio interactive cable television system including a multi-channel transmission line and a novel audio insertion unit.

In a typical application of such a two-way CATV transmission system as described in the aforementioned copending applications, the transmission line is a coaxial cable 10 having a capacity of twenty television channels, six of which are reserved for private television programs. Of these reserved channels, three forward channels are reserved for transmission of television programs in the forward direction, i.e. from the central station 12 to the remote terminal stations T1, T2 . . . Private television programs may either originate at the central station or else at one of the remote terminals designated as a program origination station. In the latter case, television programs are transmitted via three reserved return channels to the central station and then retransmitted on the forward channels to selected remote terminals under the control of the computer 14 in the central station 12. In a typical case, that is where three forward channels and three return channels are reserved for private television programs, the return channels are below commercial channel 2, i.e. in the range of 10–30 MHz whereas the forward channels are typically located in the mid-band spacing between channels 6 and 7 or else in the super-band above channel 13.

In the typical application of a teacher transmitting a television program from a remote origination terminal to other remote terminals, i.e. students, under the control of the computer 14, even though the program may be originated from any source and transmitted on a forward television channel of the cable, each student terminal has an audio input means for permitting the student to superimpose his voice or other audio signal on the television program for transmission to the other designated terminals. This is accomplished generally by providing in each terminal audio input means for transmittng the terminal's return audio back to the central station selectively on three different audio return channels, each having an audio carrier frequency associated with a different one of the three forward television channels. Each terminal includes three crystal-controlled oscillators 15, 16 and 17 which, for the example shown in FIG. 1, may produce audio carrier frequencies of 5.5 MHz, 5.55 MHz and 5.60 MHz, respectively. Digital signals transmitted along the cable operate digital circuits 18 which select the oscillator to be operative at a particular terminal. The audio carrier is then modulated by the audio input of the terminal. This modulation function is shown in FIG. 1 by an audio transmitter 19 and a microphone 2 which is manually operated by pushing a push-to-talk button 21.

The audio carrier modulated by the terminal's return audio signal is transmitted via a tap 22 on a separate audio return channel of cable 10 to the central station 12 where it is received and detected by an audio receiver 24. The detected audio is then applied to an audio insertion unit 26 to which also is applied the IF television signal derived from teh forward television channel corresponding to the particular audio return carrier frequency or channel. The central station contains an audio receiver and audio insertion unit for each forward television channel which is to have the audio interactive capability, even though only the components for one channel are shown in FIG. 1. Consequently, return audio is superimposed upon the audio subcarrier of the television signal which is then modulated by a channel modulator 27 to the proper forward channel frequency and retransmitted via cable 10 to the computer-designated terminals, such as terminal T1, where the television signal, including the video, the original program audio, and the return audio, is reveived by the television receiver 28.

In the typical case mentioned above wherein there are provisions for three different television programs, there must be three different audio return channels or audio return carrier frequencies, one associated with a different one of each of the three television channels. In the embodiment of FIG. 1, these three return audio carrier frequencies are provided by three crystal controlled oscillators in each remote terminal unit, with all three of the audio carrier frequencies being in the range approximately of 5 to 5.5 MHz. In another embodiment of the invention to be described below, the three return audio carrier frequencies are provided by three crystal controlled oscillators in the central station 12, with these audio carrier frequencies being transmitted over three separate forward audio channels on the cable 10, modulated by the audio inputs of the designated terminals, and returned via a return audio carrier channel to the central station so that the return audio input can be inserted upon the corresponding television signal by means of the audio insertion unit 26.

The principal feature of this invention involves an improved audio insertion unit. In the prior art audio insertion unit 30 illustrated in FIG. 2, the television program signal was applied to a television receiver 32 which demodulated the television program signal into a baseband video component on a video carrier of 45.75 MHz and an audio baseband component on an audio subcarrier of 41.25 MHz. The return audio from the remote terminal was then mixed with the program audio in a mixer 34. The demodulated video and the composite audio were then applied to a TV modulator 36 and transmitted along forward TV channel of the cable 10. The disadvantages of demodulating and remodulating the video signal have already been discussed above.

Figure 3:
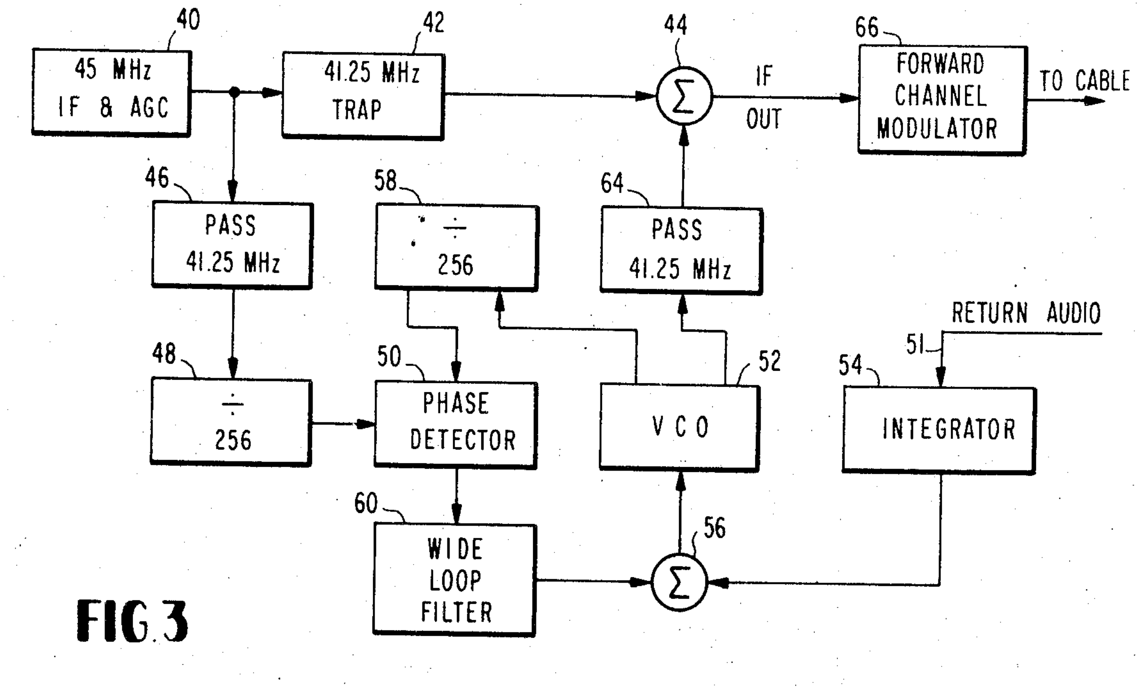
FIG. 3 is a schematic block diagram of one embodiment of a novel audio insertion unit.

FIG. 3 illustrates one form of an improved audio insertion unit which does not require demodulation of the video to its baseband frequency. In this case, block 40 represents the 45 MHz IF or intermediate frequency of a forward television channel plus the automatic gain control AGC, which may be obtained from, for example, the IF stage of a TV receiver. The video signal is allowed to pass through a 41.25 MHz trap 42 to a mixer 44. However, the trap 42 blocks the 41.25 MHz audio subcarrier frequency. A 41.25 MHz pass filter 46 passes the audio subcarrier frequency to a divider 48 which divides the frequency by 256 and applies it to one input of phase detector 50.

Each audio insertion unit also includes a voltage controlled oscillator VCO 52 nominally at an FM center frequency of 41.25 MHz. The voltage controlled oscillator is frequency modulated by the return audio input from the microphone in the terminal. The return audio is applied via an input 51 to an integrator 54 whose output is applied through a mixer 56 to frequency modulate the output of the VCO 52. The modulated output of the VCO is fed through another divider 58 whose output in turn is fed to another input of the phase detector 50. The phase detector 50 compares the phases of the outputs of blocks 48 and 58 and produces an error signal whose amplitude is proportional to the difference in phase between the 41.25 MHz audio carrier derived from the television signal and the 41.25 MHz component in the output of the VCO 52. This error signal which contains the original program audio is passed through a wide loop filter 60 whose output is mixed into mixer 56 with the audio input from the integrator 54.

VCO 52, phase detector 50, wide loop filter 60 and the mixer 56 form what is known as a phase locked loop. However, in conventional phase locked loops, the loop contains a very narrow band pass filter which passes only the low frequency error signal rather than the wide loop filter 60 as shown in FIG. 1, which wide loop filter passes both the low frequency error signal and the two audio signals. Looking at this loop and ignoring the return input audio, the loop functions both to lock the VCO center frequency to the audio subcarrier of 41.25 MHz, and also to follow the original audio on the television signal. The integrated return audio is inserted in the feedback loop of the phase locked loop so that the output of the VCO is also frequency modulated by the return audio input.

The output of the VCO 52 passes through a 41.25 MHz pass filter 64 whose output is applied to the mixer 44 which adds the composite audio to the original IF television signal. The IF output of the mixer 44 is then applied to a forward channel modulator 66 which modulates the IF up to the frequency of the proper television forward channel of the cable. This forward television channel is then received by all terminals so designated by the computer 14 in FIG. 1.

Figure 4:
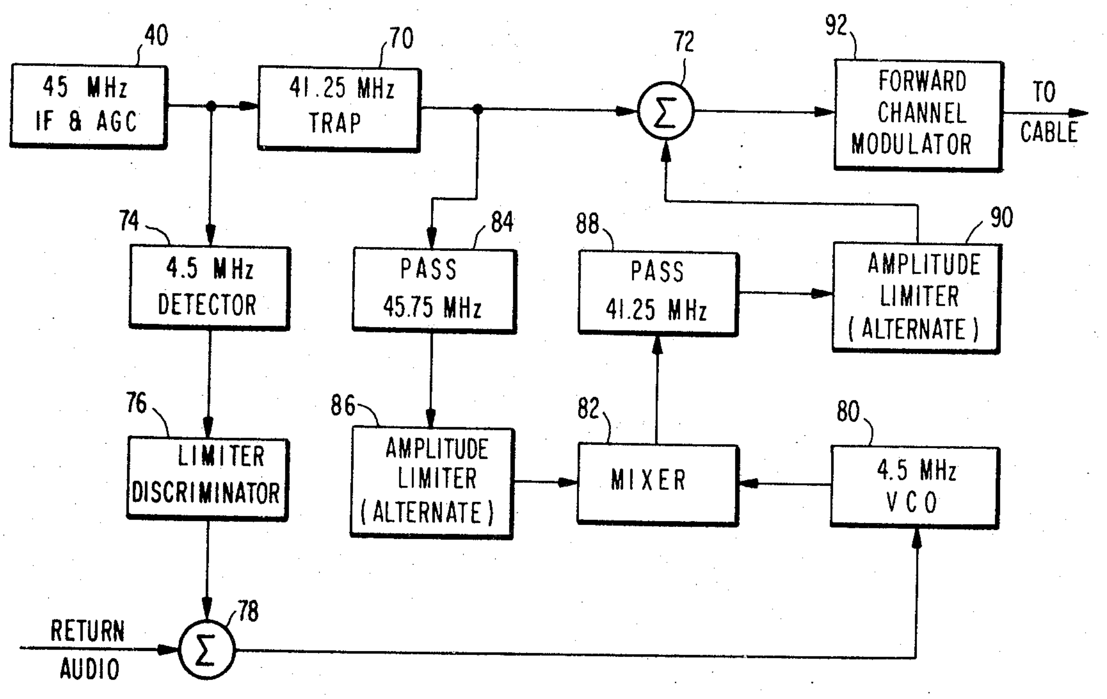
FIGS. 4 and 5 are schematic block diagrams of variations of the audio insertion unit shown in FIG. 3.
Figure 5:
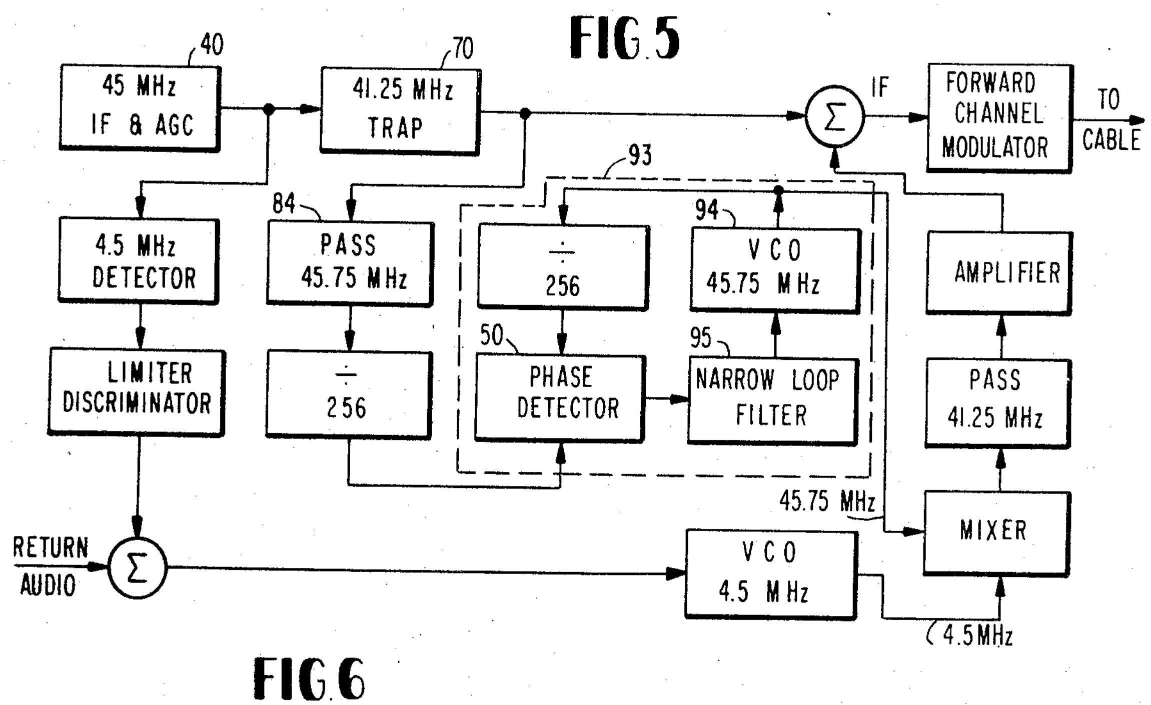

Variations of the audio insertion unit of FIG. 3 are illustrated in FIGS. 4 and 5. These variations are useful when it is desired to correct the required 4.5 MHz spacing between the audio (41.25 MHz) and video (45.75 MHz) carrier frequencies of the television signal. These systems are especially useful where the main audio-video forward channel signal is generated by modulators having less strict frequency spacing specifications for reasons of cost.

In FIG. 4, the 45 MHz intermediate frequency is passed through a 41.25 MHz trap filter 70 to a linear summer 72. The filter 70 blocks the 41.25 MHz audio subcarrier frequency. However, a 4.5 MHz detector 74 detects the 4.5 MHz fm intercarrier. The output of the detector is passed through a limiter discriminator 76 whose program audio output is mixed in the linear mixer 78 with the return audio signal from the remote terminal. The composite audio output of the mixer 78 modulates a 4.5 MHz voltage controlled oscillator 80 whose output is applied to a mixer 82. The other input to mixer 82 is the 45.75 MHz video carrier with the video modulation removed. This video carrier is obtained by means of 45.75 MHz pass filter 84 and an amplitude limiter 86. This video carrier and the composite FM audio from the output of the VCO are mixed by mixer 82 to produce an FM, 41.25 MHz audio subcarrier with the proper frequency placement with respect to the video carrier. The filter 84 and amplitude limiter 86 eliminate the AM side bands on the 45.75 MHz video carrier, thereby preventing video side bands from appearing on the audio subcarrier. The output of the mixer 82 is passed through a 41.25 MHz pass filter 88, and then to the mixer 72 to produce the composite video-audio IF signal having both the original program video and program audio in addition to the talk back audio added at the mixer 82. This IF is modulated up to the appropriate channel frequency by a forward channel modulator 92. The amplitude limiter 86 may be deleted and replaced by an alternate amplitude limiter 90; i.e. only one of the amplitude limiters 86 and 90 is required.

FIG. 5 illustrates an audio insertion unit which is a variation of the one illustrated in FIG. 4. In the FIG. 5 variation, the amplitude limiter 86 or 90 of FIG. 4 is replaced by a phase locked loop 93 including a 45.75 MHz voltage controlled oscillator 94. This phase locked loop is similar to that shown in FIG. 3 except the loop filter 95 is a narrow band filter, and the VCO 94 has a center frequency of 45.75 MHz. Loop 93 functions to remove the video modulation on the 45.75 MHz video carrier in the frequency domain rather than in the time domain as accomplished by the amplitude limiter of FIG. 4.

As pointed out above, the embodiments of FIGS. 4 and 5 are especially useful where correction of the audio-video frequency spacing (4.5 MHz) is desired.

Figure 6:
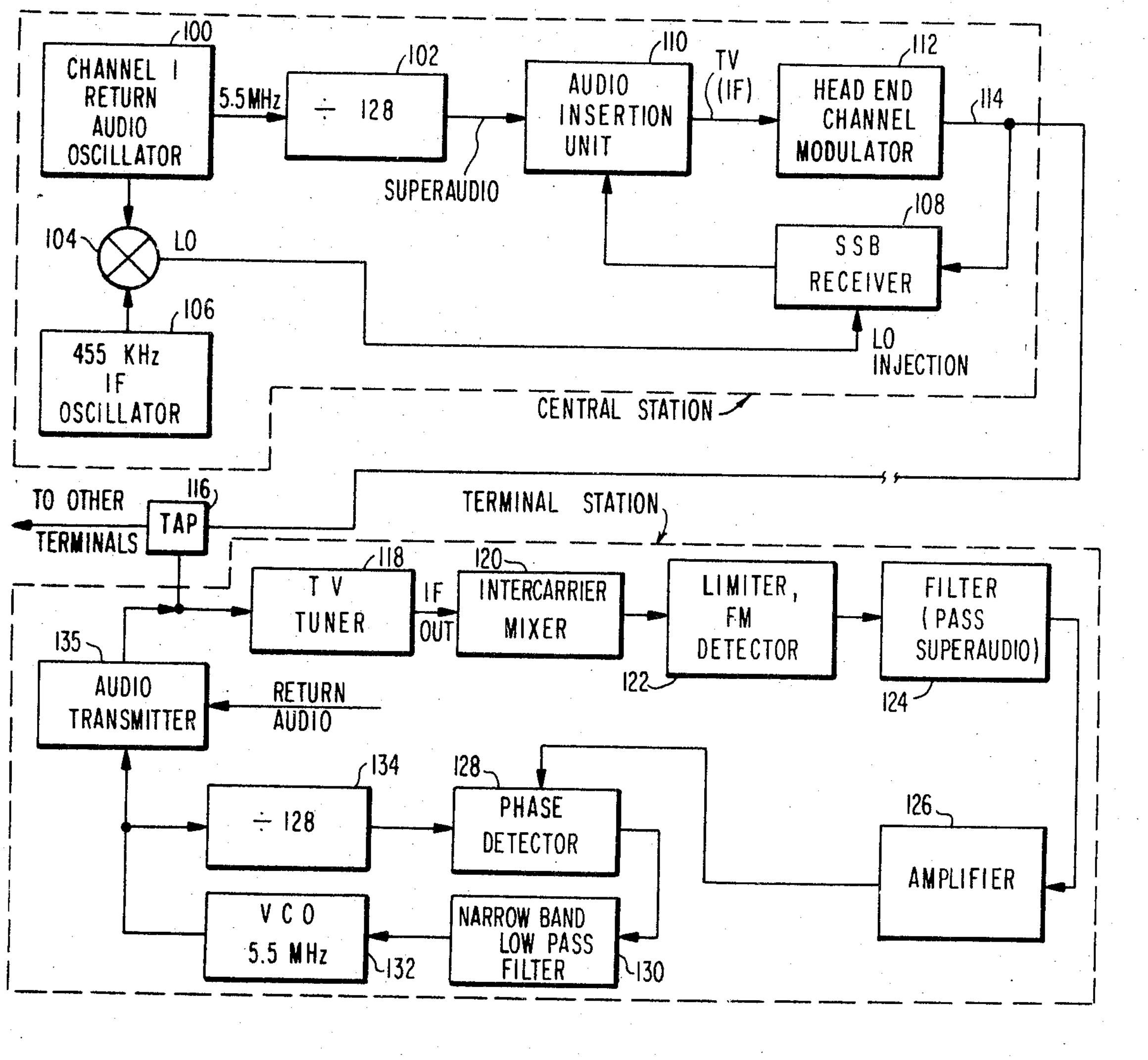
FIG. 6 is a block diagram of another embodiment of a novel audio interactive two-way CATV system.

FIG. 6 illustrates another embodiment of the invention wherein the audio carriers for the return audio channels are generated in the central station rather than in the remote terminals, thereby eliminating the need to generate the return audio carrier frequencies at each remote station. Again, in the exemplary system shown in FIG. 6, it is assumed taht there are three forward private television channels and, therefore, three audio return channels in the exemplary range of 5 to 5.5 MHz. The central station will contain three return audio oscillators, each spaced slightly apart in frequency but within the 5 to 5.5 MHz range. For simplicity, FIG. 6 shows only one of these oscillators which is designated by the block 100 and labelled "Channel 1 Return Audio Oscillator".

The audio carrier frequency of oscillator 100 corresponds to channel 1 of the three private television channels. Its output is coupled to a frequency divider 102 which outputs a carrier in the supersonic audio range, e.g. approximately 50 KHz. The output of the oscillator 100 is also offset by mixing it in a mixer 104 with a frequency equal to the audio return receiver intermediate frequency, e.g. 455 KHz, provided by an IF OSCILLATOR 106 and then used as the local oscillator for the single side band receiver 108. The audio output from the receiver 108 is then applied to an audio insertion unit 110 together with the output of the divider 102 to add these signals into the forward channel audio-video television signal. The audio insertion unit 110 may be any of the units shown in FIGS. 4, 5 and 6. The output of this unit is then modulated up to the proper television channel frequency by a head end channel modulator 112 whose output is applied to the two way coaxial cable 114.

Taps spaced along the cable couple various remote terminal stations to the cable. In FIG. 6, one exemplary terminal station is shown connected to the cable through a tap 116. The TV signal is demodulated by a TV tuner 118 which produces the TV intermediate frequency, i.e. 45 MHz, which is then fed to an intercarrier mixer 120 which produces the FM audio signal which is then demodulated by a limiter and FM detector 122 whose output is the TV program audio plus the super audio signal. This signal is passed through a filter 124 which passes only the super audio signal which is then amplified in amplifier 126 and fed to a phase detector 128 which is part of a phase locked loop which regenerates the original head end oscillator frequency 5.5 MHz of oscillator 100. The phase locked loop includes a narrow band low pass filter 130, a voltage controlled oscillator 132 and a frequency divider 134. The regenerated carrier is AM modulated by the return audio input from the terminal station in audio transmitter 135. This signal is then applied to the tap 116 and fed back along the return audio channel of the two-way cable 114. The return audio is then received in at the central station and demodulated by the single side band receiver 108 whose audio output is fed into the audio insertion unit 110 so that the return audio is again sent out along the forward television channel by the head end channel modulator 112 so that all remote terminal stations tuned to Channel 1 receive the return audio superimposed on the TV Channel 1. The advantage of this arrangement is that it assures that all remote terminals will operate upon the same three unique return audio channel frequencies since the return audio carrier oscillators are located in the central station and are common to all remote terminals. By associating one of these oscillators with each of the three television channels over which interactive audio may be sent, a unique audio return frequency may be defined for each such channel. All audio returns from terminals tuned to a particular TV channel will be at precisely identical frequencies, making the reception by the single side band method more effective.

While the invention has been particularly seown and described with reference to preferred embodiments thereof, it will be understood by those skilled in the art that various changes in form and details may be made therein without departing from the spirit and scope of the invention.

We claim:

1. In an audio interactive two-way television cable transmission system wherein a central station and a plurality of remote terminal stations are interconnected by a multi-TV channel transmission line; said central station including television signal transmitter means for transmitting on a forward TV channel a television program signal, including a video signal and a program audio signal, for reception by a remote terminal station; return audio signal input means in said remote station for transmitting a return audio signal modulated on a return audio carrier from said remote terminal station via said return audio channel to said central station; an audio receiver in said central station for receiving the modulated audio carrier and demodulating it to reproduce the return audio signal; and audio insertion means at said central station for superimposing the demodulated return audio signal on the program audio subcarrier of the television signal; an improved audio insertion means comprising:

a. first filter means for deriving from said video signal the program audio signal-modulated subcarrier frequency thereof;

b. a frequency modulator having a center frequency equal to said subcarrier frequency;

c. audio input means for frequency modulating said modulator with the demodulated return audio signal;

d. a phase locked loop connected between the output and input of said modulator for phase locking the modulator output to the derived program audio signal-modulated subcarrier frequency;

1) said phase locked loop comprising:

a. a phase detector having a first input coupled to the output of said modulator, b. wide pass filter means for passing a phase error signal frequency and also program audio and return audio signal frequencies, and c. first mixer means having one input connected to the output of said phase detector and its output connected to the input of said modulator;

e. means for applying the derived program audio signal-modulated subcarrier to a second input of said phase detector in said phase locked loop;

f. means for applying the demodulated return audio signal to another input of said first mixer in said phase locked loop, whereby the output of said modulator is said audio subcarrier frequency modulated by both said program and return audio signals;

g. second filter means for removing from said television signal its audio subcarrier frequency to produce a video modulated signal; and h. a second mixer means for mixing together said video modulated signal and the output of said modulator to reproduce said television signal having modulated on the audio subcarrier thereof both the original program audio signal and the return audio signal.

2. An audio interactive two-way television cable transmission system as defined in claim 1 further comprising a plurality of oscillators for generating a corresponding plurality of return audio carriers, each associated with a different forward TV channel.

3. An audio interactive two-way television cable transmission system as defined in claim 2 wherein said oscillators are located in said central station, and means for transmitting the audio carriers to the remote terminal stations to be modulated by the respective return audio signals.

4. An audio interactive two-way cable television system as defined in claim 3 further comprising a. first divider means at said central station for converting the audio carrier output of each oscillator to a superaudio frequency signal which is applied to said audio insertion means and superimposed on said television signal;

b. detector and filter means at said remote terminal for recovering said superaudio signal from said television signal; and c. a phase locked loop at said remote terminal and coupled between said return audio input means and said detector and filter means; said loop comprising:

1. a voltage controlled oscillator having a center frequency approximately equal to the frequency of said audio carrier and having its output connected to said return audio input means;

2. second divider means for converting the output of said voltage controlled oscillator to approximately said superaudio carrier frequency;
3. phase detector means connected between said second divider means and said detector and filter means to produce an output error signal dependent upon the difference in phase between the recovered superaudio signal and the output of said voltage controlled oscillator; and
4. a narrow band filter connected between input of said voltage controlled oscillator and the output of said phase detector means for locking the voltage controlled oscillator output to the frequency and phase of said audio carrier, whereby the output of said voltage controlled oscillator is modulated in said return audio signal input means by said return audio and transmitted via said return audio channel of said cable to said central station.

5. An audio interactive two-way television cable transmission system as defined in claim 2 wherein said plurality of oscillators are located at each remote terminal station.

6. An audio interactive two-way television cable transmission system as defined in claim 1 wherein said modulator comprises a voltage controlled oscillator.

7. In an audio interactive two-way television cable transmission system wherein a central station and a plurality of remote terminal stations are interconnected by a multi-TV channel transmission line; said central station including television signal transmitter means for transmitting on a forward TV channel a television program signal, including a video signal and a program audio signal, for reception by a remote terminal station; return audio signal input means in said remote station for transmitting a return audio signal modulated on a return audio carrier from said remote terminal station via said return audio channel to said central station; an audio receiver in said central station for receiving the modulated audio carrier and demodulating it to reproduce the return audio signal; and audio insertion means at said central station for superimposing the demodulated return audio signal on the program audio subcarrier of the television signal; an improved audio insertion means comprising:

a. first filter means for deriving from said television signal the video-audio frequency modulated intercarrier frequency thereof;
b. demodulator means for demodulating the intercarrier to produce said program audio signal;
c. first mixer means for mixing together the demodulated program audio signal and said return audio signal to produce a composite audio signal;
d. second filter means for removing the program audio signal-modulated subcarrier from said television signal to produce a video-signal modulated television carrier;
e. circuit means for removing the video signal from said modulated television carrier to produce a pure television carrier;
f. modulator means for frequency modulating said composite audio signal at said intercarrier frequency,
g. second mixer means for mixing together said pure television carrier and the modulated intercarrier frequency to produce an output of the television audio subcarrier modulated by said composite audio signal, and
h. third mixer means for mixing together said video signal-modulated television carrier and the output of said modulator to reproduce said television signal having said composite audio signal modulated on the audio subcarrier thereof.

8. An audio interactive two-way television cable transmission system as defined in claim 7 wherein said circuit means comprises an amplitude limiter for removing the amplitude modulated video signal from said television carrier.

9. An audio interactive two-way television cable transmission system as defined in claim 7 wherein said circuit means comprises a phase locked loop operating at the television carrier frequency for removing the video signal from said television carrier.

* * * * *